United States Patent
Forrest, II

(10) Patent No.: US 7,809,120 B2
(45) Date of Patent: Oct. 5, 2010

(54) COLLECT CREDIT CARD SERVICE

(76) Inventor: Alfred T. Forrest, II, 540 N. Spoonhill Dr., Sarasota, FL (US) 34236

( * ) Notice: Subject to any disclaimer, the term of this patent is extended or adjusted under 35 U.S.C. 154(b) by 842 days.

(21) Appl. No.: 11/452,174

(22) Filed: Jun. 13, 2006

(65) Prior Publication Data

US 2007/0041535 A1 Feb. 22, 2007

Related U.S. Application Data

(60) Provisional application No. 60/694,960, filed on Jun. 29, 2005.

(51) Int. Cl.
*H04M 15/00* (2006.01)
(52) U.S. Cl. .................. 379/114.19; 379/114.21; 379/114.23
(58) Field of Classification Search ............ 379/114.01, 379/114.19, 114.2, 114.21–114.25, 127.04, 379/127.05, 143, 144.02
See application file for complete search history.

(56) References Cited

U.S. PATENT DOCUMENTS

| | | | |
|---|---|---|---|
| 4,935,956 A | 6/1990 | Hellwarth et al. ........... 379/112 |
| 5,163,083 A | 11/1992 | Dowden et al. ............... 379/88 |
| 5,210,789 A | 5/1993 | Jeffus et al. .................. 379/127 |
| 5,335,266 A | 8/1994 | Richardson, Jr. et al. ...... 379/88 |
| 5,627,887 A * | 5/1997 | Freedman ............... 379/114.21 |
| 5,754,633 A | 5/1998 | Levy ........................... 379/114 |
| 5,909,485 A | 6/1999 | Martin et al. ................ 379/144 |
| 6,195,419 B1 | 2/2001 | Gilboy ........................ 379/111 |
| 6,282,274 B1 | 8/2001 | Jain et al. .................... 379/114 |
| 6,639,977 B1 * | 10/2003 | Swope et al. ........... 379/114.21 |
| 6,668,045 B1 | 12/2003 | Mow ....................... 379/88.19 |
| 6,728,355 B2 | 4/2004 | Kowalski ............... 379/142.06 |
| 6,728,771 B2 | 9/2004 | Manto ................... 379/114.05 |
| 6,836,540 B2 * | 12/2004 | Falcone et al. ......... 379/127.02 |
| 7,013,002 B2 * | 3/2006 | Link et al. ............. 379/144.02 |
| 2003/0198325 A1 | 10/2003 | Bayne ................... 379/114.21 |

* cited by examiner

*Primary Examiner*—Quoc D Tran
(74) *Attorney, Agent, or Firm*—Brian S. Steinberger; Law Offices of Brian S. Steinberger, P.A.

(57) ABSTRACT

Systems and methods for operator type calling and billing is accomplished by either automated operator instruction prompts, live operator instruction prompts or a combination of both automated and live operator prompts and live or automated billing verification and authorization processes. The operator call type and billing method can be used for operator calls such as calling card, credit card, collect, third party or person-to-person operator calls. In an embodiment the called party is given the option of paying for the incoming collect telephone call with a credit or debit card or with a calling card.

7 Claims, 3 Drawing Sheets

COLLECT CREDIT CARD SERVICE

This application claims the benefit of priority to U.S. Provisional Patent Application No. 60/694,960 filed on Jun. 29, 2005.

FIELD OF THE INVENTION

This invention relates to providing telephone communications between a calling party and a called party and, in particular, to apparatus, methods, systems, and devices for allowing the called party to pay for the collect telephone call with a credit card.

BACKGROUND AND PRIOR ART

Conventional methods of placing telephone calls utilizing so called "reverse billing", wherein a called party assumes the cost of the call, involve the placing of collect telephone calls. A collect telephone call can be placed by a calling party and the called party may then accept or deny the call and the associated charges. The cost of the collect call is billed to the called number and appears on the telephone billing statement of the called number. Thus, the collect call billing method is restricted to the telephone service account of the called number, i.e., the specific destination number.

It is well known that penal facilities are largely filled with poor people. The families of these poor incarcerated persons are often poor also, and may have their phones prohibited (blocked) from receiving collect calls and/or disabled from making toll calls (e.g., "900" type calls). Incarcerated persons are almost exclusively limited to making collect calls. Thus, it can be expensive, if not impossible for an incarcerated person to call a family member. Further, incarcerated persons have limited opportunities to make phone calls due to restricted access to telephones. In addition, friends and family members cannot directly call an incarcerated person, as the incarcerated person does not have a phone in his or her individual cell. Therefore, there remains a need for an improved channel of communication between incarcerated persons and their families, so as to ease the financial and scheduling burdens normally placed on the families of incarcerated persons.

On the other hand, a calling party has the option of placing a telephone call from any telephone and paying for the call by alternate means, such as with a credit card or a prepaid calling card. In these situations, the calling party is usually the owner of the card or account. Thus, they are in control of the account and any associated Customer Identification and Verification (CIV), such as a Personal Identification Number (PIN).

In many situations, a called party, such as a relative, friend, or business associate of a calling party, may have an important need for establishing telephone communications with the calling party that allows the called party to accept the cost of the call while maintaining ownership and control of the charged account. For example, a parent may have an important need to allow a child to call home from a public telephone without using a calling card, credit card, collect charging, or coins. Another example exists in connection with correctional facilities, where family members may wish to receive calls from an inmate and accept the charges of the call without incurring higher costs associated with normal collect calling. Yet another example exist where the called party may be at a destination number where accepting charges to that account would be inappropriate, such as a parent or husband at their place of employment.

U.S. Patent Application Pub. No. 2003/0198325 discloses specialized pre-paid calling and voice messaging systems and methods for allowing inmates to communicate with parties outside of custodial facilities. Calls to and from an inmate are pre-paid by way of advertising revenue and/or by way of pre-paid calling cards, smart cards, credit cards, etc. supplied by the outside parties. A call processing system may be configured to receive a call from an inmate and to connect the call to an outside party able to provide up-front payment for the call. If the outside party is not able to provide up-front payment for the call, the call processing system may allow the inmate to record a voice message that can subsequently be accessed by the outside party. An access fee may be charged to the outside party for access to the voice messaging system. The call processing center may also be configured to present targeted advertising messages to inmates and/or to outside parties at selected times.

Another system disclosed in U.S. Pat. No. 6,282,274 enables a telecommunications service subscriber to designate billing options for outgoing and incoming calls on a per-call basis, even if the subscriber's account includes several numbers and/or addresses and also preferably allows users to designate default billing accounts on a per-number basis. The subscriber may have a plurality of service accounts established in a database such as service profile. Calls for personal use and calls for other uses (e.g., business calls, separate client accounts, etc.) may be distinguished on a per-call basis by the call originator for outgoing calls or by the call recipient for incoming calls if the recipient is billed for incoming calls. For both outgoing and incoming calls, network usage is automatically allocated to the appropriate service account.

U.S. Pat. No. 6,639,977 discloses a system and method that allows a calling party to call a destination number and, upon approval of the called party, reverse the billing of the telephone call so that it is deducted from an account owned and maintained by the called party other than the account associated with the destination number. The method includes the steps of receiving a predetermined access number from a calling party; prompting for a destination number; notifying a called party of the call they are receiving; allowing the called party to accept the call and enter a number associated with an account other than the telephone service account of the destination telephone number; verifying the account number and whether the account has sufficient value available; completing the telephone call to the destination number; and processing the charges associated with the call to be charged against the account.

U.S. Pat. No. 6,668,045 discloses a computerized system that allows inmates of a correctional institution to communicate with parties outside the facilities via telephonic or electronic messaging events. The system provides a means to bill for the events while controlling to whom the inmate can communicate with or from whom they may receive communications, including controlling the method, the length, limited content editing, the frequency of communicating, storage of and the manner of alerting a recipient of a message or receipt thereof.

However, no current methods are known that allow the called party the same flexibility that is to direct charges of a telephone call to a credit card, debit card, or prepaid calling card.

SUMMARY OF THE INVENTION

A primary objective of the invention is to provide new apparatus methods, systems, and devices to allow incoming collect calls to be paid by credit card to a called party account.

A secondary objective of the invention is to provide new apparatus methods, systems, and devices to allow incoming collect calls to be paid by debit card from a called party account.

A third objective of the invention is to provide new apparatus methods, systems, and devices to request a quotation of the rates charged for the incoming collect call prior to accepting the incoming collect call.

The present invention provides a method for allowing a called party to use a credit card to pay for an incoming collect telephone call. A caller places a collect telephone call with a telecommunication service provider and the called party is notified that the called party has an incoming collect telephone call from a caller, the notification is provided by the telecommunication service provider. The called party is given collect call payment options and the called party, selects one of said collect call payment options. If the payment option is authorized, the called party and the caller are connected. If the called party fails to select one of the payment options, the caller is notified that the collect call was rejected. If the payment option is not authorized, the caller is notified that the collect call was rejected because the selected payment option was not authorized. Alternatively, if the payment option is not authorized, alternative payment options are provided for the called party. In a second embodiment the caller is provided the option of paying for the incoming collect telephone call with a debit card.

In another embodiment of the present invention provides a system for completing operator type calls. The caller uses a public telephone for contacting a service provider offering operator type calls to call a called party. The service provider provides an operator interface for communicating with the caller to select an operator call type and a payment type for completing the call to the called party according to the operator call type selected and an interface authorizing the selected call payment type selected by one of the caller and the called party, wherein if the call payment type is authorized the caller is connected with the called party.

Further objects and advantages of this invention will be apparent from the following detailed description of preferred embodiments which are illustrated schematically in the accompanying drawings.

DESCRIPTION OF THE PREFERRED EMBODIMENTS

Figure 1:
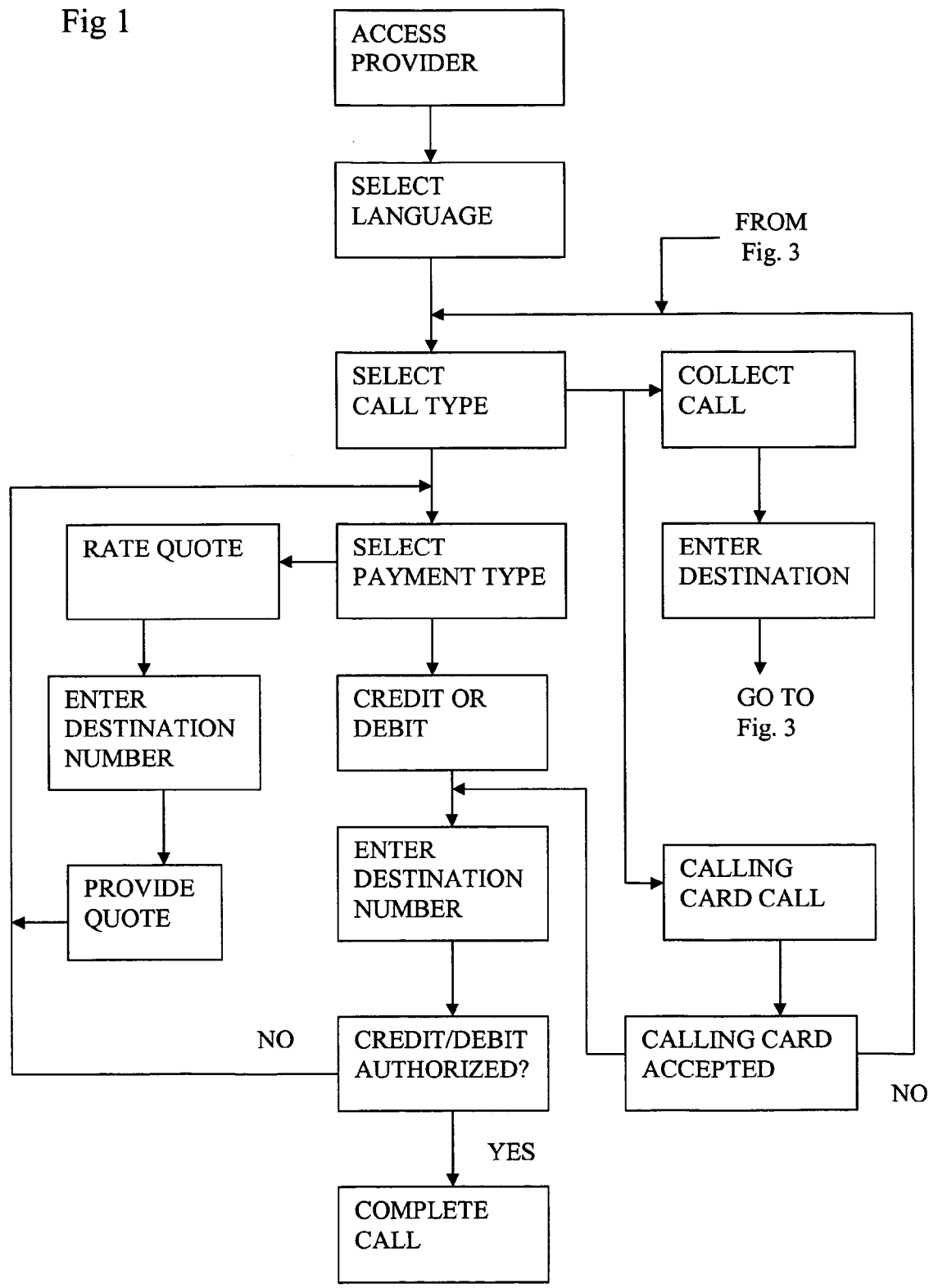
FIG. 1 is a flow diagram of the initial call set-up procedures according to the present invention.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The methods, systems, apparatus and devices of the present invention provide a novel operator call type and billing method that can be utilized, but not limited to, operator calls such as calling card, credit card, collect, third party or person-to-person operator calls. As a result, the telecommunications service provider using the systems and methods of the present invention increases the number of collect and credit card calls that are completed successfully. The telecommunication service provider provides the caller with the option of paying for the call by a means other than coins inserted into a pay telephone or paying by credit or debit card at a high rate.

When the caller places a calling card, credit card, collect, third party or person-to-person operator call, the Operator Service Provider, Inmate Service Provider or Store and Forward Provider, using the novel billing systems and methods is used for selecting a payment method to complete the call successfully. The operator call type and billing method of the present invention is accomplished by either automated operator instruction prompts, live operator instruction prompts or a combination of both automated and live operator prompts and live or automated billing verification and authorization processes.

Caller access to a telecommunication service provider using the present invention may be via a toll free telephone number or the caller may place the call from a public access telephone such as a pay phone, a public telephone that only allows outgoing local calls, or a hospitality telephone. Traditional pay telephones are placed in location not only convenient to traveling public, but in locations to provide access for low income households that may not have telephone service. The user is required, after entering the destination number, to insert coins sufficient to pay for the call for a length of time. However, the caller may not have sufficient change. In other cases the pay telephone may allow credit card transactions if the caller enters a credit card into the slot provided. If the caller does not have sufficient change or a credit card, the remaining option is to place a collect call. Telecommunication service providers associated with the public access telephones may charge an additional fee for placing the collect call and may also charge a high rate for the call.

However, most pay telephones and other public telephones allow callers to connect with toll free telephone numbers. In this example, the caller may use a calling card to place the call. If the service provider associated with the public access telephone does not accept the calling card, the caller is still unable to complete the toll free call. Alternatively, the caller uses a public access telephone that is associated with the telecommunication service provider using the novel system and method and automatically connects the user with the service provider.

Figure 2:
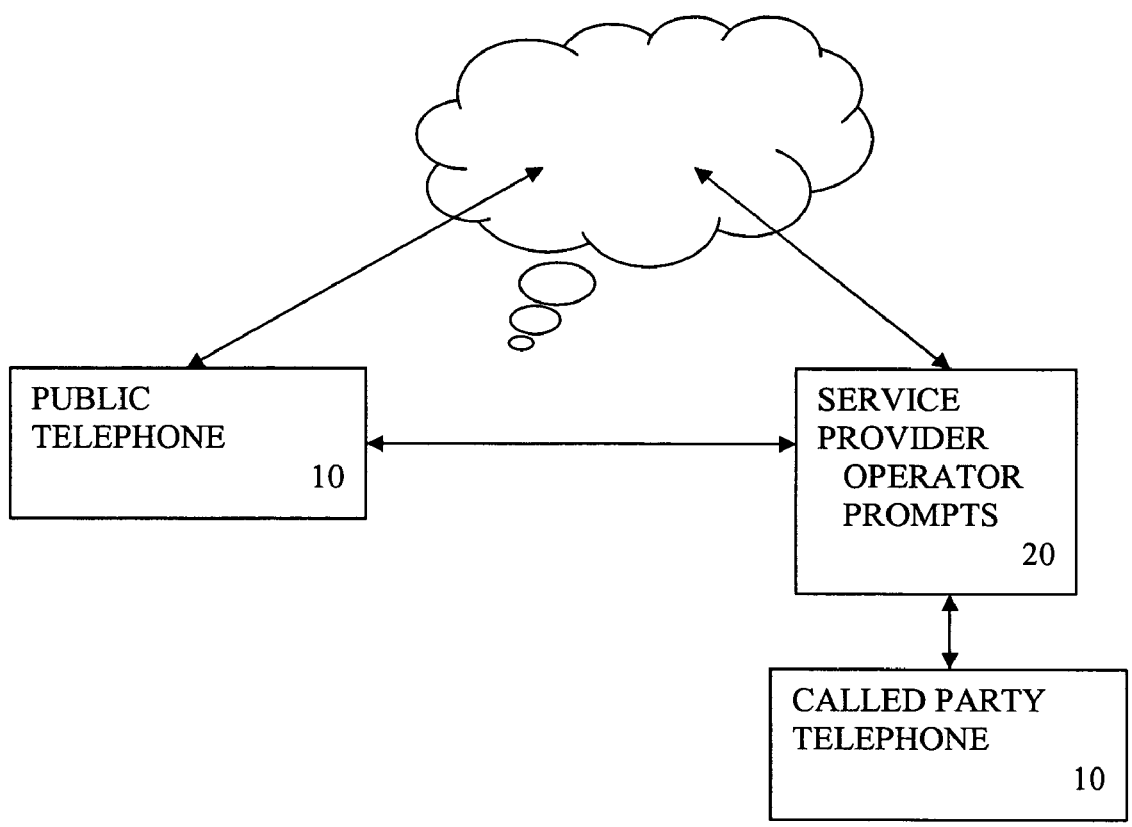
FIG. 2 is a system block diagram according to the present invention.

FIG. 1 is a flow diagram showing the initial call set-up procedures according to the present invention and FIG. 2 is a system block diagram showing an example of a system using the method of the present invention. First, the caller accesses the service provider using a toll free telephone number to connect directly to the system or from a hospitality or pay telephone 10 that connects directly with a service provider 20 that is using the methods and systems of the present invention. The caller selects a call type such as a collect call, a calling card, credit card, third party or person-to-person operator call. If the call is to be paid for by the caller, the caller is prompted to select a form of payment such as credit card, debit card or cash.

If the caller selects credit card or debit card, the caller is prompted to enter a destination telephone number, a credit card number and expiration date or a debit card number and a personal information number. If the payment is authorized, the caller is connected with the called party and the transaction is billed to the selected credit card or debit card. The caller is also given the option of receiving a rate quote. The caller is prompted to enter the destination telephone number before the rate quote is provided. After the caller receives the rate quote, the caller is again prompted to select a payment type.

In an alternative embodiment, by calling the telecommunication service provider 20, the caller has automatically requested a collect call and is prompted to enter a destination telephone number corresponding to a called party 30. Whether the caller automatically requests a collect call by contacting the service provider directly or the caller selects the collect call type, the caller is prompted to enter a destination telephone number.

Figure 3:
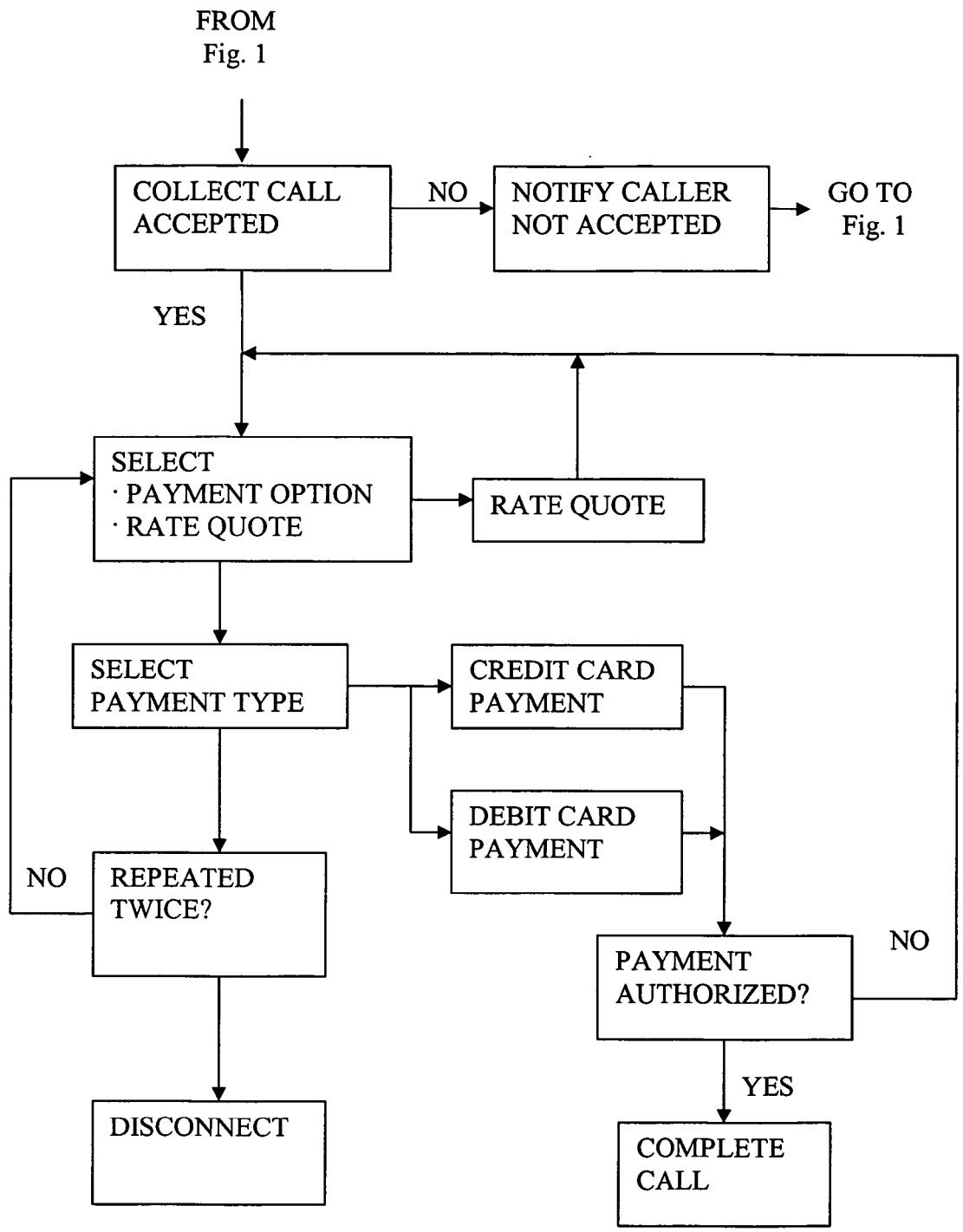
FIG. 3 is a flow diagram showing the steps for a called party in response to an incoming collect call.

The called party is notified that they have an incoming collect call. FIG. 3 is a flow diagram of the steps followed by the called party after notification that the incoming telephone call is a collect call. If the called party accepts the incoming collect call, the called party is prompted to enter a credit or debit account number to which the charges may be billed. The system automatically determines whether the debit account has sufficient funds for payment of the call or that the credit card account can be billed for the incoming collect call. If the payment method selected is authorized, the call is completed and the caller is connected with the called party. If the payment is not authorized, the called party is again given the option of selecting another payment option or to refuse the collect call.

Prior to selecting a payment type, the called party may request a rate quote. After receiving the rate quote, the called party is again prompted to select a payment type. If the called party wants to decline the collect call, the called party may disconnect the call or may select the prompt corresponding to rejecting the charges for the incoming collect call. In response, the system informs the caller that the collect call was refused. The caller is given the option of calling another destination telephone number, in which case the payment options described above may be repeated. The caller may also request that the prompts be repeated to give the caller additional time to select an option as shown in FIG. 3. After repeating the instructions twice, the system disconnects the caller if an option is not selected.

When a collect call is made to a party that does not allow collect calls to be billed to the called parties telephone service provider, the caller is informed that collect calls cannot be billed to the destination number. In this example, the called party may have their telephone prohibited (blocked) from receiving incoming collect telephone calls because of the high cost charged by the service provider. The systems and methods of the present invention allow the called party the option of accepting the collect call and billing the charges to a credit card or a debit card.

The notification of the incoming collect call may be by live Operator instruction, an automated instruction notification or a combination thereof. Regardless of the notification type, the present invention provides systems and methods for prompting the called party to accept the charges and bill the charges at a lower rate than the rate typically charged by the traditional service provider. Prior to accepting the collect call, the called party may request a rate quote. If the called party still refuses to accept the charges, the called is prompted to select an alternative call type or call payment option, request a rate quote or enter a new destination telephone number.

In another embodiment of the present invention, the caller elects to place a calling card call using a toll free telephone number from a public telephone such as a hospitality telephone or pay telephone. However, the service provider associated with the public telephone may not allow calling card transactions. Since toll free calls can be made from pubic telephones, the caller may directly contact the service provider using the methods and system of the present invention.

Alternatively, the caller uses a public access telephone that is associated with the telecommunication service provider using the novel system and method of the present invention. By contacting the telecommunication service provider directly or indirectly, the caller has requested a collect call and is prompted to enter a destination telephone and the called party is notified that they have an incoming collect call as previously described and shown. In this example, the called party is again given the option of paying for the collect call by credit or debit card or to receive a rate quote prior to accepting the charges.

In summary, the methods and systems of the present invention provide alternative options for a caller using a telephone that does not accept calling cards and gives the called party receiving an incoming collect call the option of paying by credit card or debit card without incurring the cost of completing the collect call through the local exchange service provider. Additionally, the called party considering accepting the charges can request a rate quote before making the decision to accept the charges.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A method for providing operator type calls from a public telephone to increase the number of calls that are completed successfully, the method consisting essentially of the steps of:

contacting a telecommunication service provider providing the operator type calls by a caller using a toll free telephone number to the telecommunication service provider or using a telephone that connects directly to the telecommunication service provider;

selecting one of the operator assisted call types selected from a group consisting of collect call, calling card, credit card, third-party call or person-to-person call operator assisted call;

selecting a payer option for the operator assisted call to be paid for by the caller or a called party;

providing call payment options to the said caller according to the operator assisted call type selected when payment is by the caller;

selecting one of said call payment options as credit card, debit card and cash when payment is by the caller;

entering the credit card number and expiration date or debit card and personal identification number by caller if the payment option is one of a caller credit or debit card;

entering a destination telephone number for a called party if the payment is authorized or the call type is collect call;

providing the caller with an option to receive a rate quote;

providing the rate quote upon request after receiving the destination telephone number to the caller by the telecommunication service provider when the rate quote option is selected;

contacting the called party if the payment option is the collect call;

notifying the called party that they have a collect call;

providing the called party with the payment option of credit card or debit card to avoid collect call charges billed on the called parties monthly statement if the caller accepts the collect call;

providing the called party with the option for a rate quote;

providing the rate quote to the called party when the rate quote option is selected;

selecting one of said call payment options as credit card and debit card when payment is by the called party;

entering the credit or debit card information by called party if the payment option is one of a called party credit or debit card;

connecting said called party and said caller if the call payment is authorized;

charging the one of the caller and the called party for the operator assisted call type telephone call; and notifying the caller if the payment option to the caller was not selected by the called party and if the authorization was not received;

prompting the caller to select a different payment option if the called party refuses to accept the charges;

selecting one of said call payment options as credit card, debit card and cash when payment is by the caller;

providing the caller with the option of entering a different destination telephone number if the called party refuses to accept the charges; and repeating the step following the entering a new destination step if a new destination telephone number is entered.

2. The method of claim 1, wherein the contacting step comprises the step of:

selecting one of:

directly contacting the telecommunication service provider via a toll free telephone number from a public telephone that does not allow calling card telephone transactions;

directly contacting the telecommunication service provider via a toll free telephone number from a pay telephone;

directly contacting the telecommunication service provider by using a pay telephone provided by the telecommunication service provider, wherein use of the pay telephone automatically requests a collect telephone call; and directly contacting the telecommunication service provider by using a hospitality or pay telephone that connects directly with the telecommunication service provider.

3. A system for completing operator type calls consisting essentially of:

a public telephone for contacting a service provider offering operator assisted type calls for a caller to enter a destination telephone number to call a called party;

an operator assisted telephone call rate offered by the store and forward service provider;

a destination telephone that prohibits acceptance of collect calls;

an operator interface for communicating with the caller to select an operator call type including third party call, person-to-person call and collect call and a payment option for completing the operated assisted call to the called party according to the operator assisted call type selected operator interface comprising:

a first series of prompts for the caller to select an operator assisted call type including a first prompt for selecting one of a credit card and a debit card call, a second prompt for selecting a calling card call, a third prompt for selecting a collect call and a fourth prompt for requesting a rate quote, wherein the caller enters a destination telephone number and the caller receives a rate quote in response to the destination number when a rate quote is requested; and a second series of prompts for one of the caller and the called party for selecting a call payment type according to the selected operator call type;

a third series of prompts to collect payment information including collecting a credit card number and expiration date when credit card option is selected and collecting a debit card number and personal identification number when the debit card payment is selected;

a fourth series of prompts when the destination telephone prohibits acceptance of collect calls to allow the called party the option of accepting the telephone call with credit card or debit card payment;

a fifth series of prompts when the call fails including notifying the caller when the called party refuses the payment options, the payment option selected by the called party fails, and the called party disconnects to allow the calling party to enter a different destination telephone number; and an interface for authorizing the selected call payment type selected by one of the caller and the called party, wherein if the call payment type is authorized the caller is connected with the called party.

4. The system of claim 3, wherein the public telephone is selected from a pay telephone and a hospitality telephone, wherein using the public telephone automatically connects the caller with the store and forward service provider's operator interface.

5. The system of claim 3, wherein the first prompt comprises:

an enter card number prompt;

an expiration date prompt if the credit card prompt is selected;

a personal identification number prompt if the debit card prompt is selected; and an authorization for the selected one of the credit and debit card.

6. The system of claim 3, wherein the public telephone comprises:

a pay telephone that does not allow calling card use, wherein the caller uses a toll free telephone number to connect with the store and forward service provider operator interface.

7. A method for allowing a called party to use a debit card and a credit card to pay for an incoming collect telephone call, the method consisting of the steps of:

using a telephone provided by a correctional institution that only allows outgoing calls and directly connects with a telecommunication service provider, wherein use of the telephone automatically requests a collect call that allows the called party to pay the charges by calling card, credit card or debit card payment and the tele phone is used by inmates to communicate with others outside the correctional institution;

entering a destination telephone number;

notifying said called party of an incoming collect telephone call from a caller, said notification coming from said telecommunication service provider;

prior to acceptance of the collect call charges, allowing the called party the option of receiving a rate quote for acceptance of the collect call;

providing a rate quote to the called party for credit and debit card payment, the rate charged is a lower rate than the rate charged by the called parties service provider collect call charges;

providing collect call payment options including destination service provider billing, credit card, debit card, and calling card to said called party;

said called party, selecting one of said collect call payment options;

prompting the caller to enter a debit card number followed by a personal identification number if the called party selects debit card payment;

checking availability of funds for said debit card;

connecting said called party and said caller if said funds are available;

allowing the called party to select an alternate call payment option if the debit card payment funds are not available;

prompting the caller to enter a credit card number followed by expiration date if the called pay selects credit card payment;

checking for credit card payment authorization;

connecting the caller with the called party if the credit card payment was authorized;

prompting the called party for a calling card destination number and personal identification if the called party selects calling card payment option;

checking available call time;

connecting the caller with the called party if the calling card charges are authorized; and notifying the caller if the called party does not accept the call charges or the payment options selected fails;

providing the caller with the option of entering a different destination telephone number;

repeating the steps following entering a destination telephone number.

* * * * *